(12) United States Patent
Hendrickson et al.

(10) Patent No.: US 7,818,630 B2
(45) Date of Patent: Oct. 19, 2010

(54) FRAMEWORK FOR AUTOMATICALLY ANALYZING I/O PERFORMANCE PROBLEMS USING MULTI-LEVEL ANALYSIS

(75) Inventors: Richard Charles Hendrickson, Austin, TX (US); Santhosh Rao, Austin, TX (US); Peter Wai Yee Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1311 days.

(21) Appl. No.: 11/334,666

(22) Filed: Jan. 18, 2006

(65) Prior Publication Data
US 2007/0168053 A1 Jul. 19, 2007

(51) Int. Cl.
*G06F 11/00* (2006.01)
(52) U.S. Cl. .......................... 714/47; 714/43
(58) Field of Classification Search ................. 714/46, 714/47, 57, 43
See application file for complete search history.

(56) References Cited

U.S. PATENT DOCUMENTS

| | | | |
|---|---|---|---|
| 5,761,411 A * | 6/1998 | Teague et al. ................. 714/47 | |
| 6,049,842 A | 4/2000 | Garrett et al. | |
| 6,272,564 B1 | 8/2001 | Garrett et al. | |
| 6,334,162 B1 | 12/2001 | Garrett et al. | |
| 6,338,102 B1 | 1/2002 | Garrett et al. | |
| 6,532,552 B1 * | 3/2003 | Benignus et al. ............... 714/25 |
| 6,618,825 B1 * | 9/2003 | Shaw .......................... 714/55 |
| 6,647,515 B1 * | 11/2003 | Hefferon et al. ............... 714/47 |
| 7,069,480 B1 * | 6/2006 | Lovy et al. .................... 714/57 |
| 7,181,769 B1 * | 2/2007 | Keanini et al. ................. 726/23 |
| 7,197,561 B1 * | 3/2007 | Lovy et al. ................... 709/224 |
| 7,650,532 B2 * | 1/2010 | Fukui ............................. 714/6 |
| 2002/0152185 A1 * | 10/2002 | Satish Jamadagni ........... 706/1 |
| 2004/0153823 A1 * | 8/2004 | Ansari ......................... 714/38 |
| 2005/0278273 A1 * | 12/2005 | Uthe ............................. 707/1 |

OTHER PUBLICATIONS

"OMNI", Linux Technology Center, http://omniprint.sourceforge.net/, retrieved Oct. 18, 2005.

* cited by examiner

*Primary Examiner*—Joshua A Lohn
(74) *Attorney, Agent, or Firm*—Yee & Associates, P.C.; Matthew W. Baca

(57) ABSTRACT

A computer implemented method, data processing system, and computer usable code are provided for analyzing input/output problems. A monitoring agent collects input/output data from a plurality of levels in a multi-level input/output stack. The monitoring agent analyzes the input/output data from the plurality of levels to form an analysis. A determination is then made as to whether the analysis requires an action and an action is initiated in response to a determination that the analysis requires an action.

20 Claims, 3 Drawing Sheets

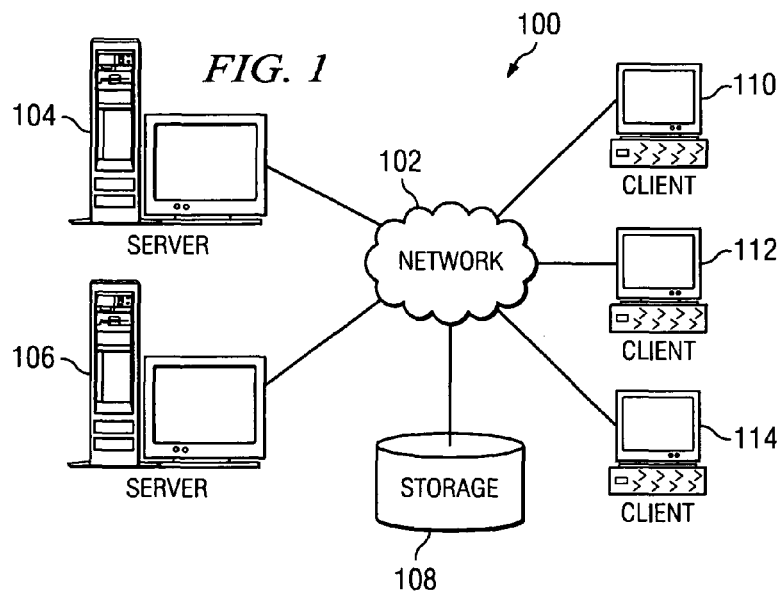

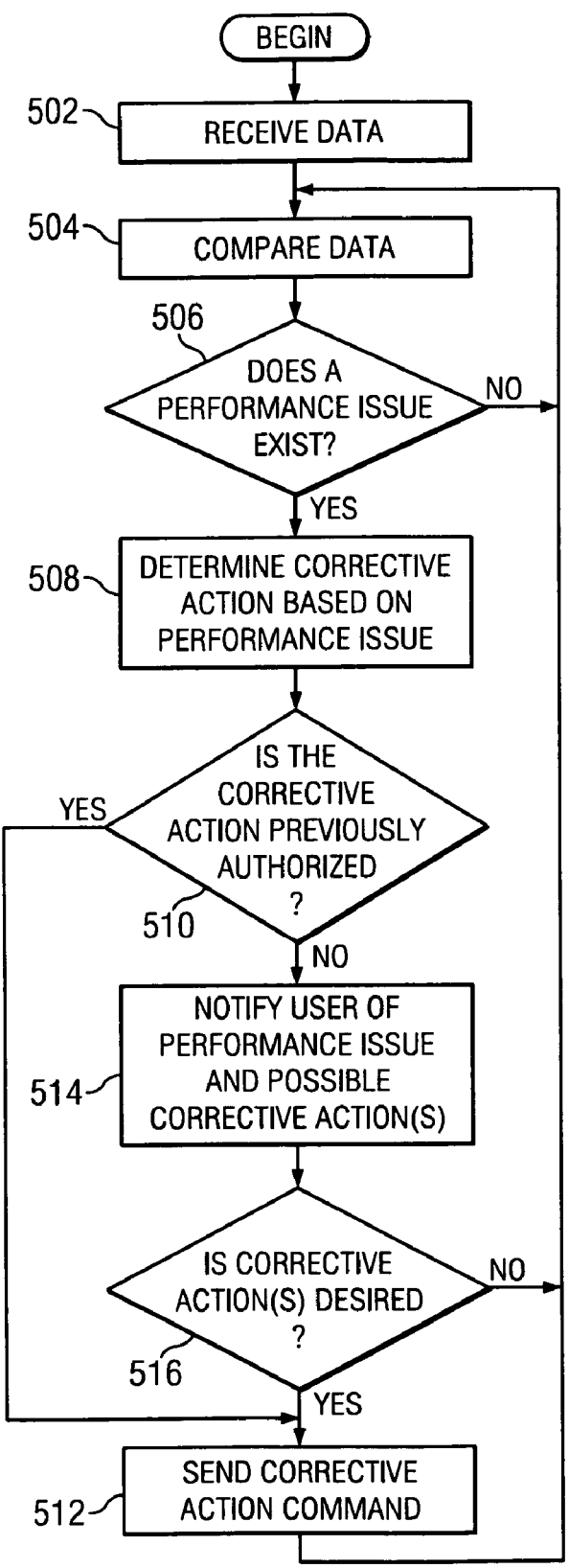

FRAMEWORK FOR AUTOMATICALLY ANALYZING I/O PERFORMANCE PROBLEMS USING MULTI-LEVEL ANALYSIS

BACKGROUND OF THE INVENTION

1. Field of the Invention

The present invention relates generally to input/output performance. More specifically, the present invention relates to automatically analyzing input/output performance problems using a multi-level system.

2. Description of the Related Art

Modern software systems have complex, multi-level input/output stack implementations which make input/output performance issues difficult to diagnose and understand. Although much of the data needed for performance analysis is provided from various levels of the software stack, this data is usually segregated and, as a result, cannot be easily analyzed.

An exemplary illustration is an input/output performance problem in a data warehousing environment where a database administrator observes poor input/output performance after a migration to different hardware, operating system, or database management system versions. Assuming that such a database management system issues a large amount of sequential input/output requests and the storage device is capable of handling those requests and high throughput, the database administrator expects a high transfer rate. However, due to various configurations or operating system problems, the database administrator actually gets a very low transfer rate and high input/output wait time. Many hypotheses may be formed and time is required to verify each one of the hypotheses. Exemplary hypotheses may be:

(1) If a file system with multiple threads accessing a small set of files is being used, there might be file locking issues or problems with file layout.
(2) Poor query plans could be generated by the optimizer, resulting in sub-optimal input/output patterns.
(3) A Redundant Array of Independent Disks (RAID) array could have degraded and many extra input/output operations are required to service reads.
(4) The system could be under memory pressure and input/output queues could become congested writing out dirty data.
(5) The files being retrieved could be highly fragmented.

The database administrator begins by running a number of existing tools, such as vmstat, iostat, or even a profiler like oprofile, to collect various kinds of data. Then, the administrator is required to look over all of this data for anomalies that could point to the cause. After looking through the information, the administrator may find out that the system has a very high interrupt rate and that the storage device is 100 percent busy throughout the query. That leads the administrator to look at low level input/output statistics and find that the operating system is driving down a large number of smaller input/output operations unexpectedly. So now the administrator has found the basic problem, such as, smaller than expected input/output requests are being issued to the device. After a lot of trial and error, the database administrator looks for points in the input/output stack where requests are made and eventually suspects the filesystem. The administrator may then use more specific tools, such as filefrag, to examine file layout and find severe file fragmentation. In this case, a defragmentation tool may be applied as a corrective action.

Although there are a number of input/output performance tools available, such as sar, iostat, vmstat and strace, none of them are able to look at different levels in the input/output stack and analyze the data. Overall, these tools only give hints as to why performance is poor, and none of the tools are designed to perform any type of multi-level analysis.

SUMMARY OF THE INVENTION

The different aspects of the present invention provide a computer implemented method, data processing system, and computer usable code for analyzing input/output problems. Input/output data is collected from a plurality of levels in a multi-level input/output stack. The input/output data from the plurality of levels is analyzed to form an analysis. A determination is made whether the analysis requires an action and, in response to a determination that the analysis requires an action, an action is initiated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which aspects of the present invention may be implemented;

FIG. 2 depicts a block diagram of a data processing system in which aspects of the present invention may be implemented;

FIG. 5 is a flow diagram of the monitoring agent operation in accordance with an illustrative embodiment of the present invention.

DETAILED DESCRIPTION OF THE PREFERRED EMBODIMENT

Figure 3:
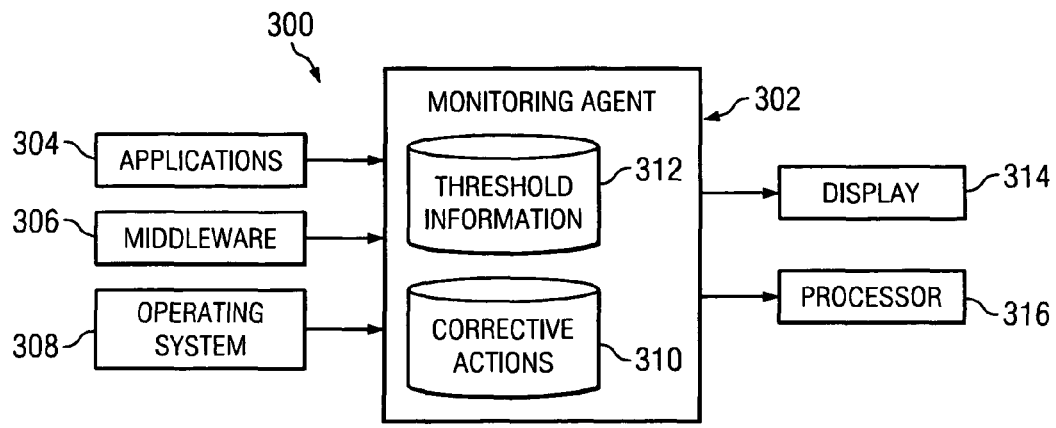
FIG. 3 depicts a functional block diagram of a monitoring agent framework in accordance with an illustrative embodiment of the present invention.

The aspects of the present invention relate to automatically analyzing input/output performance problems using a multi-level system. FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a framework that is used in autonomic environments for analyzing I/O performance issues, providing corrective action issues, and issuing corrective actions by looking at the aggregated data from different levels of the I/O stack.

FIG. 3 depicts a functional block diagram of a monitoring agent framework in accordance with an illustrative embodiment of the present invention. Framework 300 includes monitoring agent 302 for conducting input/output performance analysis on the software stack including applications 304, middleware 306, and operating system 308. In a distributed computing system, middleware is defined as the software layer that lies between the operating system and the applications on each site of the system. For example, there are a number of middleware products that link a database system to a Web server. This allows users to request data from the database using forms displayed on a Web browser, and it enables the Web server to return dynamic Web pages based on the user's requests and profile. Common middleware categories include: Enterprise Service Buses, Transaction Processing monitors, Distributed Computing Environments, Remote Procedure Call systems, Object Request Brokers, Database access systems, and Message Passing.

A multi-level I/O stack is a collection of software components transferring input/output requests between multiple levels of a software stack and is characterized by high frequency of input/output requests. Some examples of a multi-level I/O stack are Websphere® applications or DB2 applications running on Linux®, where input/output traverses from the application to the middleware, through the kernel and then to the block device driver and to the fibre channel device driver.

Framework 300 uses exported input/output information and optional methods for carrying out corrective actions for participating software. Framework 300 uses monitoring agent 302 to receive the input/output requests from the participating software and perform simple computations on the input/output data obtained from the participating software to provide corrective action if a pre-determined threshold is met or exceeded. Input/output data is data that is transferred by a program, operation, or device to or from a computer and to or from a peripheral device.

Monitoring agent 302 contains corrective actions 310 which are located in a data structure of corrective actions. The data structure may be in memory or other type of storage device. These corrective actions are actions that may be used by a user or administrator in the event of poor performance. Corrective actions 310 may be specific corrective actions directed to applications 304 and middleware 306, or general corrective actions directed to operating system 308. Corrective actions are actions such as defragmentation or adjusting tuning parameters. Monitoring agent 302 also contains threshold information 312, which in these illustrative examples are user set performance degradation thresholds or limits that will be allowed prior to use of a corrective action. Exemplary thresholds may be the meeting or exceeding of a ratio between various sizes of input/output requests or the frequency between input/output requests, although other thresholds may also be used. Some corrective actions can be triggered automatically without human intervention.

If a corrective action is determined by monitoring agent 302 based on a threshold being met or exceeded, monitoring agent 302 may then notify the user of the threshold violation and possible corrective actions on display 314. The user then has the option of ignoring the problem or selecting a corrective action that may improve operating performance. If the user selects a corrective action, monitoring agent 302 then issues the corrective action to processor 316 for execution. Some corrective actions can be triggered automatically without human intervention.

An example of a performance issue that would cause monitoring agent 302 to alert a user is when there is a large discrepancy between the average input/output request sizes at different levels of the software stack, such as, the system call level and the device driver level. In this example, monitoring agent 302 computes the ratio between the average input/output size at the system call level and the average input/output size at the device drive level. Thus, if the average input/output size at the system level is 500 KB and the average input/output size at the device driver is 10 KB, monitoring agent 302 would calculate a ratio of 50. If the threshold in threshold information 312 for the ratio between the average input/output size at the system call level and the average input/output size at the device drive level is 2, then monitoring agent 302 would send an alert to the user via display 314 since the calculated ratio is 50.

Figure 4:
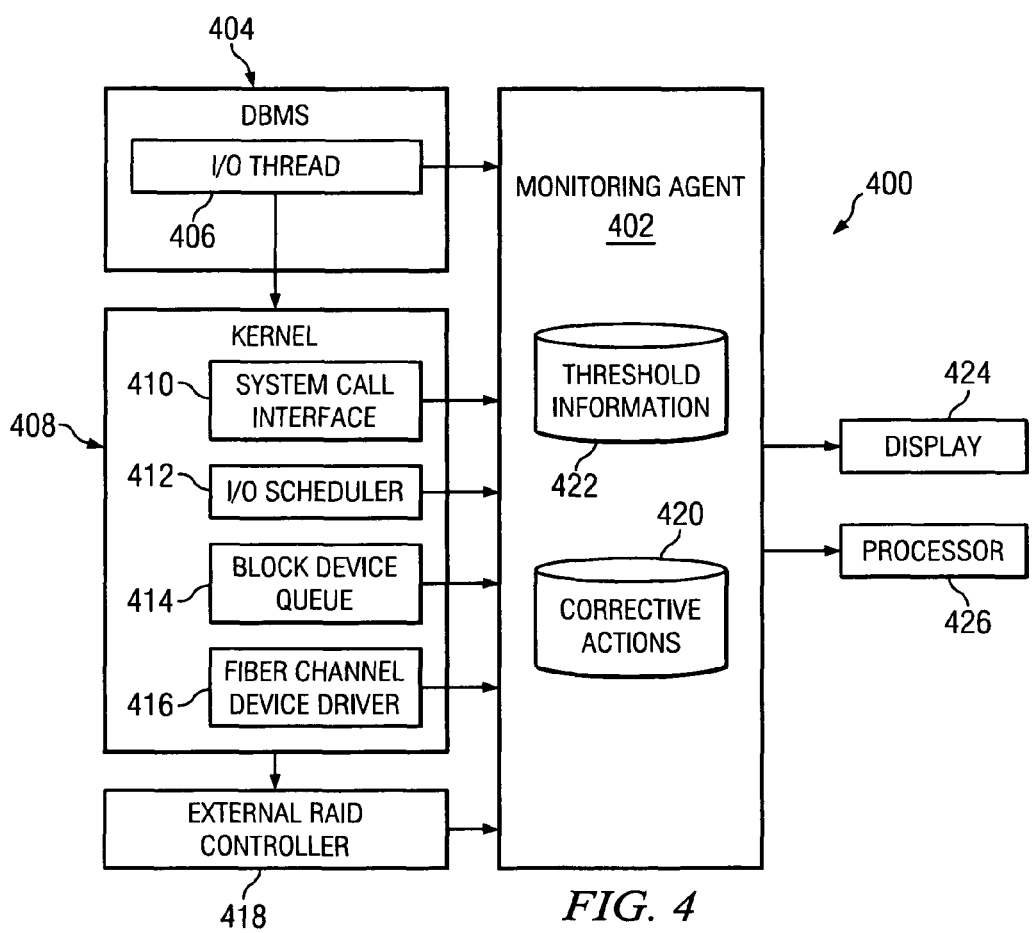
FIG. 4 depicts a functional block diagram of a more detailed monitoring agent framework in accordance with an illustrative embodiment of the present invention.

FIG. 4 depicts a functional block diagram of a more detailed monitoring agent framework in accordance with an illustrative embodiment of the present invention. Framework 400 provides an interface for any participating software in the input/output stack, such as, applications, middleware, operating system, and various kernel components, to export information to monitoring agent 402. Framework 400 also allows participating software to provide methods for issuing corrective actions, which monitoring agent 402 may use. The various pieces of participating software may have an arbitrary number of points to hook into the framework; for example, database management system 404 may have a hook at input/output thread 406, kernel 408 may have a hook at system call interface 410, input/output scheduler 412, block device queue 414, and fibre channel device driver 416, and external RAID controller 418 may have its own hook. A hook is utilized to allow an application to provide its input/output data, thresholds, corrective actions to the framework.

Monitoring agent 402 periodically samples data from the various levels within database management system 404, kernel 408, or external RAID controller 418. Monitoring agent 402 may use numerous variables to carry out monitoring operations, such as a polling frequency, a set of levels to monitor, a computation based upon the data obtained, a threshold or set of thresholds to compare the calculated value against, and a set of actions associated with the thresholds supplied from the various levels within database management system 404, kernel 408, or external RAID controller 418. Then monitoring agent 402 makes calculations, checks the calculated data against a threshold, and carries out some action if the threshold is met or exceeded.

For example, monitoring agent 402 may calculate a ratio between the size of requests at the system call level and the device driver level, as previously described. Thresholds set by a user and used by monitoring agent 402 are stored within threshold information data structure 422. The action-threshold relationship may be arbitrarily complex, for example a decision tree may be used to select which action to carry out depending on the values measured and computed. Actions will only be undertaken if the thresholds are met or exceeded.

Monitoring agent 402 may carry out an action that may be a simple alert to the administrator or interested parties on display 424, or it could be a pre-programmed procedure for correcting known issues, such as defragmentation or adjusting tuning parameters using processor 426. Corrective actions may be put into a corrective actions data structure 420. Corrective actions may be simple controls over system parameters, such as the ability to alter block device queue depth, maximum input/output size, or simple actions, such as running an on-line defragmentation program on the file system.

FIG. 5 is a flow diagram of the monitoring agent operation in accordance with an illustrative embodiment of the present invention. The process illustrated in FIG. 5 may be implemented in an agent such as, monitoring agent 302 in FIG. 3 or monitoring agent 402 in FIG. 4.

As the operation begins, data is received from various applications, middleware, operating systems, and kernel components (step 502). Once a user selects input/output data within the various levels, data will be sent to the monitoring agent. The monitoring agent may use some or all of the data to make arithmetic calculations which compares the data and indicates performance (step 504). An exemplary calculation may be the ratio between the average input/output size at the system call level and the average input/output size at the device drive level. The monitoring agent then compares the calculated data against set thresholds to determine if a performance issue exists (step 506). If a performance issue fails to exist, the operations returns to step 504. If a performance issue exists, the monitoring agent determines a corrective action(s) based on the performance issue (step 508). The monitoring agent then determines if the determined corrective action(s) have been previously authorized (step 510).

If the corrective action(s) has been authorized, the monitoring agent issues the corrective action(s) command (step 512), with the operation returning to step 504 thereafter. An exemplary command interface through which the monitoring agent may issue a command is an application program interface. If the corrective action(s) has not been previously authorized, the monitoring agent notifies the user of the performance issue and the possible corrective action(s) (step 514). The notification to the user may be through a pop-up on the display or through another means such as email, pager, or text message. The user may then choose to ignore the notification or select a correction action to be performed (step 516). If the user ignores the notification, the operation returns to step 504. If the user selects a corrective action to be performed, the monitoring agent issues the corrective action(s) command (step 512), with the operation returning to step 504 thereafter.

Thus, aspects of the present invention provide a framework that is used in autonomic environments for analyzing input/output performance issues, providing corrective action issues, and issuing corrective actions by looking at the aggregated data from different levels of the input/output stack.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing input/output problems, the computer implemented method comprising:

collecting input/output data from a plurality of levels in a multi-level input/output stack;

analyzing, by a processing unit, the input/output data from the plurality of levels to form an analysis;

comparing input/output requests at a first level within the multi-level input/output stack with input/output requests at a second level within the multi-level input/output stack;

determining whether the analysis requires an action based on a number of input/output requests at the first level exceeding a number of input/output requests at the second level by a predetermined threshold; and responsive to a determination that the analysis requires an action, initiating the action.

2. The computer implemented method of claim 1, wherein the initiating step comprises:

determining if a set of corrective actions has been previously authorized; and responsive to the set of corrective actions being previously authorized, automatically issuing a command to perform the set of corrective actions.

3. The computer implemented method of claim 1, wherein determining whether the analysis requires an action further comprises:

calculating a ratio of input/output requests at the first level within the multi-level input/output stack and input/output requests at the second level within the multi-level input/output stack;

comparing the ratio against a predetermined threshold; and responsive to the ratio meeting or exceeding the predetermined threshold, confirming that the analysis requires an action.

4. The computer implemented method of claim 3, wherein the ratio is one of size or frequency of the input/output requests.

5. The computer implemented method of claim 3, wherein the predetermined threshold is set by the user.

6. The computer implemented method of claim 1, further comprising:

responsive to the set of corrective actions being unauthorized, notifying a user of the performance issue and the set of corrective actions;

receiving an instruction from a user to implement the set of corrective actions; and responsive to receiving the instruction, issuing a command to perform the set of corrective actions.

7. The computer implemented method of claim 1, wherein the corrective action is one of defragmentation or adjusting tuning parameters.

8. A computer implemented method for analyzing input/output problems, the computer implemented method comprising:

collecting input/output data from a plurality of levels in a multi-level input/output stack;

analyzing the input/output data from the plurality of levels to form an analysis, wherein analyzing the input/output data from the plurality of levels to form an analysis further comprises:

comparing data from a first level within a stack to a second level within the stack;

calculating a value based on the comparison wherein the value is a ratio of input/output requests from the first stack and the second stack;

comparing the value against a predetermined threshold; and responsive to the value meeting or exceeding the predetermined threshold, confirming that the analysis requires an action;

determining whether the analysis requires an action; and responsive to a determination that the analysis requires an action, initiating the action.

9. A data processing system comprising:

a bus system;

a communications system connected to the bus system;

a memory connected to the bus system, wherein the memory includes a set of instructions; and a processing unit connected to the bus system, wherein the processing unit executes the set of instructions to collect input/output data from a plurality of levels in a multi-level input/output stack; analyze the input/output data from the plurality of levels to form an analysis; compare input/output requests at a first level within the multi-level input/output stack with input/output requests at a second level within the multi-level input/output stack; determine whether the analysis requires an action based on a number of input/output requests at the first level exceeding a number of input/output requests at the second level by a predetermined threshold; and initiate the action in response to a determination that the analysis requires an action.

10. The data processing system of claim 9, wherein the set of instructions to initiate the action includes a set of instructions to determine if a set of corrective actions has been previously authorized; and automatically issue a command to perform the set of corrective actions in response to the set of corrective actions being previously authorized.

11. The data processing system of claim 9, wherein the set of instructions to determine whether the analysis requires an action includes a set of instructions to calculate a ratio value of input/output requests at the first level within the multi-level input/output stack and input/output requests at the second level within the multi-level input/output stack; compare the ratio against a predetermined threshold; and confirm that the analysis requires an action in response to the ratio meeting or exceeding the predetermined threshold.

12. The data processing system of claim 11, wherein the ratio is one of size or frequency of the input/output requests.

13. The data processing system of claim 9, wherein the processing unit executes the set of instructions to notify a user of the performance issue and the set of corrective actions in response to the set of corrective actions being unauthorized;

receive an instruction from a user to implement the set of corrective actions; and issue a command to perform the set of corrective actions responsive to receiving the instruction.

14. The data processing system of claim 9, wherein the corrective action is one of defragmentation or adjusting tuning parameters.

15. A computer program product comprising:

a computer readable storage medium including computer usable program code for analyzing input/output problems, the computer program product including:

computer usable program code for collecting input/output data from a plurality of levels in a multi-level input/output stack;

computer usable program code for analyzing the input/output data from the plurality of levels to form an analysis;

computer usable program code for comparing input/output requests at a first level within the multi-level input/output stack with input/output requests at a second level within the multi-level input/output stack;

computer usable program code for determining whether the analysis requires an action based on a number of input/output requests at the first level exceeding a number of input/output requests at the second level by a predetermined threshold; and computer usable program code for initiating the action in response to a determination that the analysis requires an action.

16. The computer program product of claim 15, wherein the computer usable program code for initiating an action includes:

computer usable program code for determining if a set of corrective actions has been previously authorized; and computer usable program code for automatically issuing a command to perform the set of corrective actions in response to the set of corrective actions being previously authorized.

17. The computer program product of claim 15, wherein the computer usable program code for determining whether the analysis requires an action further includes:

computer usable program code for calculating a ratio of input/output requests at the first level within the multi-level input/output stack and input/output requests at the second level within the multi-level input/output stack;

computer usable program code for comparing the ratio against a predetermined threshold; and computer usable program code for confirming that the analysis requires an action in response to the ratio meeting or exceeding the predetermined threshold.

18. The computer program product of claim 17, wherein the ratio is one of size or frequency of the input/output requests.

19. The computer program product of claim 15, further including:

computer usable program code for notifying a user of the performance issue and the set of corrective actions in response to the set of corrective actions being unauthorized;

computer usable program code for receiving an instruction from a user to implement the set of corrective actions; and computer usable program code for issuing a command to perform the set of corrective actions in response to receiving the instruction.

20. The computer program product of claim 15, wherein the corrective action is one of defragmentation or adjusting tuning parameters.

* * * * *